(12) United States Patent
Lee et al.

(10) Patent No.: US 11,194,507 B2
(45) Date of Patent: Dec. 7, 2021

(54) CONTROLLER AND OPERATION METHOD THEREOF

(71) Applicant: SK hynix Inc., Gyeonggi-do (KR)

(72) Inventors: Joung-Young Lee, Gyeonggi-do (KR); Dong-Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/427,449

(22) Filed: May 31, 2019

(65) Prior Publication Data

US 2020/0089427 A1 Mar. 19, 2020

(30) Foreign Application Priority Data

Sep. 13, 2018 (KR) ........................ 10-2018-0109656

(51) Int. Cl.
*G06F 3/06* (2006.01)
*G06F 12/02* (2006.01)

(52) U.S. Cl.
CPC .......... *G06F 3/0656* (2013.01); *G06F 3/0658* (2013.01); *G06F 3/0659* (2013.01); *G06F 12/0246* (2013.01); *G06F 2212/7202* (2013.01)

(58) Field of Classification Search
None
See application file for complete search history.

(56) References Cited

U.S. PATENT DOCUMENTS

| | | | | |
|---|---|---|---|---|
| 5,592,671 A * | 1/1997 | Hirayama | ............. | G06F 9/4881 718/104 |
| 7,551,636 B2 * | 6/2009 | Morrison | ................ | G06F 5/065 370/412 |
| 7,584,465 B1 * | 9/2009 | Koh | .......... | G06F 8/34 717/109 |
| 7,900,010 B2 * | 3/2011 | Prasad | ................ | G06F 12/0223 711/170 |
| 8,051,265 B2 * | 11/2011 | Lee | ........ | G06F 12/023 711/165 |
| 9,135,159 B2 * | 9/2015 | Yoo | ........ | G06F 12/023 |
| 2005/0114605 A1* | 5/2005 | Iyer | ..................... | G06F 12/0888 711/133 |
| 2005/0235124 A1* | 10/2005 | Pomaranski | ........ | G06F 12/0223 711/170 |
| 2007/0033367 A1* | 2/2007 | Sakarda | ............. | G06F 12/0891 711/170 |

(Continued)

FOREIGN PATENT DOCUMENTS

KR 10-2014-0142793 12/2014
KR 10-2017-0008339 1/2017

*Primary Examiner* — Elias Mamo
(74) *Attorney, Agent, or Firm* — IP & T Group LLP

(57) ABSTRACT

A controller for controlling a memory device includes: a buffer including a plurality of segments; and a buffer manager suitable for deciding a segment attribute for each of the segments that represents one or more kinds of buffer allocation request for which the corresponding segment is allocable, deciding a priority allocation for each of the segments based on the segment attribute of the corresponding segment, and when a buffer allocation request is received, allocating one or more segments among the plurality of segments based on the segment attribute and the priorities of each of the non-allocated segments relative to the segment attributes.

14 Claims, 11 Drawing Sheets

(56) References Cited

U.S. PATENT DOCUMENTS

2014/0215177 A1* 7/2014 Kim .................. G06F 12/06
                                                711/171
2018/0253247 A1* 9/2018 Li ................... G06F 3/0631
2019/0146709 A1* 5/2019 Im ................... G06F 3/0604
                                                711/103

* cited by examiner

FIG. 4

| Segment | Read | Write | Map |
|---|---|---|---|
| 1 | 1 | 1 | 1 |
| 2 | 1 | 1 | 1 |
| 3 | 1 | 1 | 0 |
| 4 | 1 | 1 | 0 |
| 5 | 1 | 0 | 0 |
| 6 | 1 | 0 | 0 |
| 7 | 0 | 0 | 1 |
| 8 | 0 | 0 | 1 |
| 9 | 0 | 1 | 0 |
| 10 | 0 | 1 | 0 |
| 11 | 1 | 0 | 0 |
| 12 | 1 | 0 | 0 |

Segments 1–6: Dynamic Segment
Segments 7–12: Static Segment

CONTROLLER AND OPERATION METHOD THEREOF

CROSS-REFERENCE TO RELATED APPLICATION

The present application claims priority of Korean Patent Application No. 10-2018-0109656, filed on Sep. 13, 2018, which is incorporated herein by reference in its entirety.

BACKGROUND

1. Field

Various embodiments of the present invention relate to a controller, and more particularly, to a controller for controlling a memory device, and a method for operating the controller.

2. Description of the Related Art

The computer environment paradigm has been shifting to ubiquitous computing, which enables computer systems to be used anytime and anywhere. As a result, use of portable electronic devices such as mobile phones, digital cameras, and laptop computers has rapidly increased. These portable electronic devices generally use a memory system having a memory device, i.e., a data storage device. A data storage device is used as a main memory device or an auxiliary memory device of a portable electronic device.

The data storage device used as a memory device provides excellent stability, durability, high information access speed, and low power consumption, since it has no mechanical driving parts. Examples of a memory system with a data storage device having such advantages include a Universal Serial Bus (USB) memory device, a memory card having various interfaces, and Solid-State Drives (SSDs).

SUMMARY

Embodiments of the present invention are directed to a controller having a data buffer that may improve the performance of a memory system, and a method for operating the controller.

In accordance with an embodiment of the present invention, a controller for controlling a memory device includes: a buffer including a plurality of segments; and a buffer manager suitable for deciding a segment attribute for each of the segments that represents one or more kinds of buffer allocation request for which the corresponding segment is allocable, deciding a priority allocation for each of the segments based on the segment attribute of the corresponding segment, and when a buffer allocation request is received, allocating one or more segments among the plurality of segments based on the segment attribute and the priorities of each of the non-allocated segments relative to the segment attributes.

In accordance with another embodiment of the present invention, a method for operating a controller that controls a memory device includes: deciding a segment attribute for each of a plurality of segments in a buffer of the controller, each segment attribute representing one or more kinds of buffer allocation requests for which the corresponding segment is allocable; deciding a priority of allocation for each of the segments based on the segment attribute of the corresponding segment; and allocating one or more segments among the plurality of segments based on the segment attribute and the priorities of each of the non-allocated segments relative to the segment attributes, when there is a buffer allocation request.

In accordance with still another embodiment of the present invention, a memory system includes: a memory device; a controller suitable for controlling the memory device to perform a plurality of operations, wherein the controller includes: a buffer including a plurality of segments suitable for buffering data corresponding to the plurality of operations; and a buffer manager suitable for: determining one or more allocable segments, among the plurality of segments, for each of the plurality of operations; determining a priority of allocation for each of the plurality of segments based on the determined allocable segments for the plurality of operations; and allocating at least one segment among the plurality of segments based on the determined priority.

BRIEF DESCRIPTION OF THE DRAWINGS

FIG. 4 illustrates a buffer attribute table in accordance with an embodiment of the present invention.

DETAILED DESCRIPTION

Figure 1:
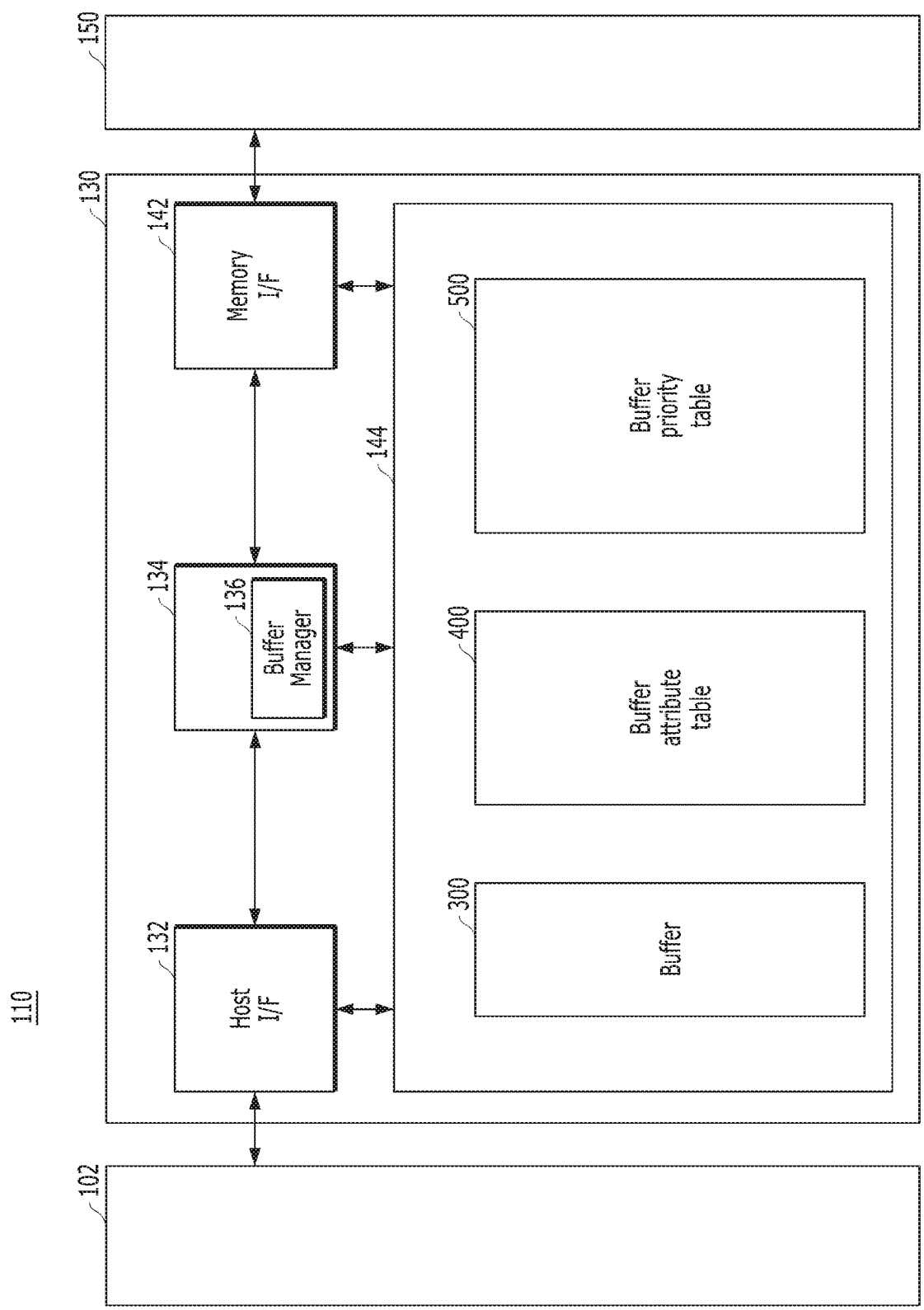
FIG. 1 is a block diagram illustrating a data processing system including a memory system in accordance with an embodiment of the present invention.

Various embodiments of the present invention are described below in more detail with reference to the accompanying drawings. The present invention may, however, be embodied in different forms and thus should not be construed as limited to the embodiments set forth herein. Rather, these embodiments are provided so that this disclosure is thorough and complete and will fully conveys the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to identify various elements, these elements should not be limited by these terms. These terms are only used to distinguish one element from another element that otherwise has the same or similar name. For instance, a first element in one instance could be termed a second element in another instance, and vice versa, without departing from the teachings of the present disclosure.

It will be understood that when an element is referred to as being "coupled" or "connected" to another element, it can be directly coupled or connected to the other element or one or more intervening elements may be present therebetween.

In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way. Communication between two elements, whether they are directly or indirectly connected/coupled, may be wired or wireless, unless the context indicates otherwise.

The terminology used herein is for the purpose of describing particular embodiments only and is not intended to be limiting. In the present disclosure, the singular forms are intended to include the plural forms and vice versa, unless the context clearly indicates otherwise. It will be further understood that the terms "comprise", "include", "have", and other open-ended transition terms, when used in this specification, specify the presence of stated features, numbers, steps, operations, elements, components, and/or combinations of them but do not preclude the presence or addition of one or more other features, numbers, steps, operations, elements, components, and/or combinations thereof.

The embodiments disclosed herein are merely for the purpose of understanding the technical spirit of the present disclosure and the scope of the present invention should not be limited to the disclosed embodiments. Those skilled in the art to which the present disclosure pertains will understand in light of the present disclosure that various modifications may be made within the scope of the present invention.

Unless otherwise defined, all terms including technical and scientific terms used herein have the same meaning as commonly understood by one of ordinary skill in the art to which the present disclosure pertains. Unless otherwise defined in the present disclosure, the terms should not be construed in an ideal or excessively formal way.

Various embodiments of the present invention will be described now in detail with reference to the attached drawings.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may include any of various portable electronic devices such as a mobile phone, MP3 player and laptop computer, or any of various non-portable electronic devices such as a desktop computer, a game machine, a television (TV), and a projector.

The host 102 may include at least one operating system (OS), which may manage and control overall functions and operations of the host 102, and provide operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. The host 102 may include a plurality of OSs, and execute an OS to perform an operation corresponding to a user's request on the memory system 110.

The memory system 110 may operate to store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include any of an embedded MMC (eMMC), reduced size MMC (RS-MMC), micro-MMC, and the like. The SD card may include a mini-SD card and/or micro-SD card.

The memory system 110 may be embodied by any of various types of storage devices. Examples of such storage devices include, but are not limited to, volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM or ReRAM) and a flash memory. The flash memory may have a 3-dimensional (3D) stack structure.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems as exemplified above. For example, the controller 130 and the memory device 150 may be integrated as one semiconductor device to constitute a solid state drive (SSD). When the memory system 110 is used as an SSD, the operating speed of the host 102 connected to the memory system 110 can be improved. In another embodiment, the controller 130 and the memory device 150 may be integrated as one semiconductor device to constitute a memory card such as a personal computer memory card international association (PCMCIA) card, compact flash (CF) card, smart media (SM) card, memory stick, multimedia card (MMC) including reduced size MMC (RS-MMC) and micro-MMC, secure digital (SD) card including mini-SD, micro-SD and SDHC, or universal flash storage (UFS) device.

Non-limiting application examples of the memory system 110 include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device that retains data stored therein even though power is not supplied. The memory device 150 may store data provided from the host 102 is through a write operation, and provide data stored therein to the host 102 through a read operation. The memory device 150 may include a plurality of memory blocks, each of which may include a plurality of pages, and each of the pages may include a plurality of memory cells coupled to a word line. In an embodiment, the memory device 150 may be a flash memory. The flash memory may have a 3-dimensional 3D) stack structure.

Figure 2:
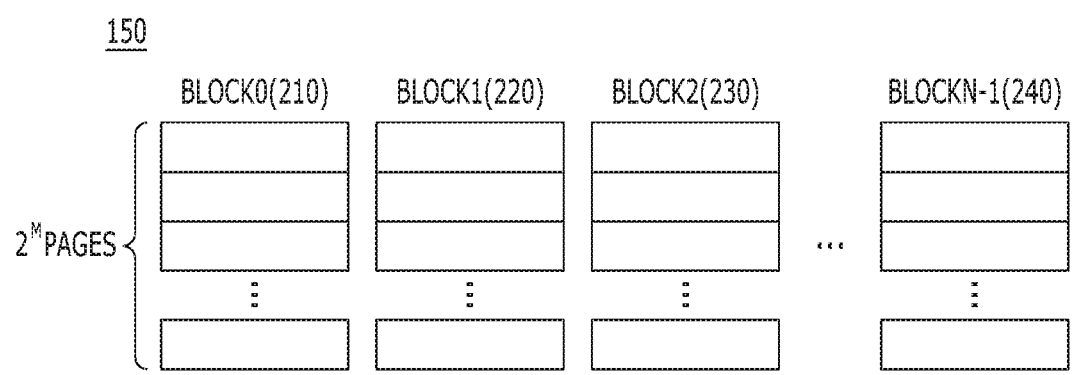
FIG. 2 illustrates a memory device of the memory system in accordance with an embodiment of the present invention.

FIG. 2 illustrates a memory device, e.g., the memory device 150 of a memory system, e.g., the memory system 110, in accordance with an embodiment of the present invention.

Referring to FIG. 2, as noted above, the memory device 150 may include a plurality of memory blocks, e.g., BLOCK0 (210), BLOCK1 (220), BLOCK2 (230), . . . to BLOCKN-1 (240). Each of the memory blocks 210, 220, 230 and 240 may include a plurality of pages, for example $2^M$ pages, the number of which may vary according to circuit design. For example, in some applications, each of the memory blocks may include M pages. Each of the pages may include a plurality of memory cells that are coupled to a plurality of word lines WL.

Each of the memory blocks included in the memory device 150 may be a single level cell (SLC) memory block, a multi-level cell (MLC) memory block, a triple level cell (TLC) memory block, a quadruple level cell (QLC) memory block, or a higher-multiple level cell memory block according to the number of bits that may be stored in one memory cell.

In accordance with an embodiment of the present invention, the memory device 150 is a non-volatile memory, such as a flash memory, e.g., a NAND flash memory. However, in other embodiments, the memory device 150 may be realized as any of a Phase Change Random Access Memory (PCRAM), a Resistive Random Access Memory (RRAM or ReRAM), a Ferroelectric Random Access Memory (FRAM), a Spin Transfer Torque Magnetic Random Access Memory (STT-RAM or STT-MRAM).

Each of the blocks 210, 220, 230 and 240 may store data provided from the host 102 through a program operation, and provide the stored data to the host 102 through a read operation.

Referring back to FIG. 1, the controller 130 of the memory system 110 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

The controller 130 may include a host interface (I/F) 132, a processor 134, an error correction code (ECC) component, a Power Management Unit (PMU), a memory I/F 142 such as a NAND flash controller (NFC), and a memory 144, all operatively coupled via an internal bus.

The host interface 132 may be configured to process a command and data of the host 102, and may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE).

The memory I/F 142 may serve as a memory/storage interface for interfacing the controller 130 and the memory device 150 such that the controller 130 controls the memory device 150 in response to a request from the host 102. When the memory device 150 is a flash memory, specifically a NAND flash memory, the memory I/F 142 may generate a control signal for the memory device 150 and process data to be provided to the memory device 150 under the control of the processor 134. The memory I/F 142 may work as an interface (e.g., a NAND flash interface) for processing a command and data between the controller 130 and the memory device 150. Specifically, the memory I/F 142 may support data transfer between the controller 130 and the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by a static random access memory (SRAM) or dynamic random access memory (DRAM). The memory 144 may be disposed within or externally to the controller 130. FIG. 1 exemplifies the memory 144 disposed within the controller 130. In another embodiment, the memory 144 may be embodied by an external volatile memory having a memory interface transferring data between the memory 144 and the controller 130.

The memory 144 may store data for performing operations such as a data write operation and a read operation between the host 102 and the memory device 150, and data produced from the operations such as a data write operation and a read operation, as described above, and the memory 144 may include a program memory, a data memory, and a buffer 300 for storing the data. According to an embodiment of the present invention, the memory 144 may store a buffer attribute table 400 and a buffer priority table 500. The buffer 300, the buffer attribute table 400, and the buffer priority table 500 according to an embodiment of the present invention will be described with reference to FIGS. 3 to 5.

The processor 134 may control the overall operation of the memory system 110. In particular, the processor 134 may control a write operation or a read operation for the memory device 150 in response to a write request or a read request from the host 102. Herein, the processor 134 may drive firmware which is called a flash translation layer (FTL) to control all the operations of the memory system 110. Also, the processor 134 may also be realized as a microprocessor or a central processing unit (CPU).

The processor 134 of the memory system 110 in accordance with an embodiment of the present invention may include a buffer manager 136 for performing buffer allocation.

Figure 3:
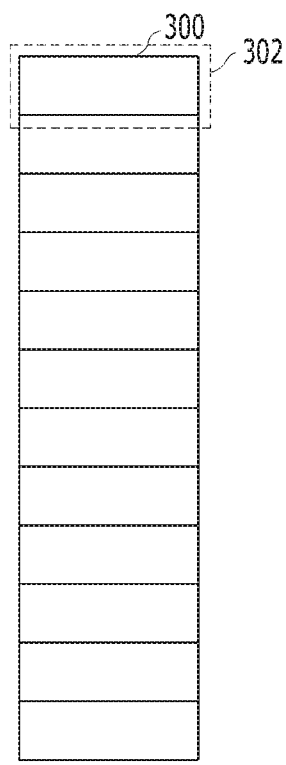
FIG. 3 illustrates a buffer in accordance with an embodiment of the present invention.

FIG. 3 illustrates a buffer, e.g., the buffer 300 of FIG. 1, and a segment in accordance with an embodiment of the present invention.

When a fixed buffer area is allocated according to the kind of the operation, a needed buffer area is not allocated even though there is buffer area remaining according to the workload of the memory system 110. As a result, the performance of the memory system 110 may be deteriorated.

When the common buffer area is used regardless of the kind of an operation, and when the workload of the memory system 110 is concentrated on performing a specific kind of operation, the performance of the memory system 110 is deteriorated because a buffer for performing a different kind of operation may not be allocated.

According to an embodiment of the present invention, the controller 130 may divide the entire buffer area into a plurality of segments, and determine a segment attribute representing one or more kinds of buffer allocation requests for which each of the segments may be allocated. Based on the segment attribute, the controller 130 may assign a high priority to a dedicated segment which may be allocated only for one kind of a buffer allocation request, and assign a low priority to a common segment which may be allocated for more than two kinds of buffer allocation requests. When there is a buffer allocation request, the controller 130 may allocate one or more segments among the segments based on the segment attribute and the priority. Within this framework, embodiments of the present invention will be described with reference to FIGS. 3 to 6.

Referring to FIG. 3, the buffer 300 may be formed of a plurality of segments. The portion 302 shown in a dotted line may represent one segment. The buffer manager 136 may allocate the buffer 300 on a segment basis when the host interface 132 or the memory interface 142 requests buffer allocation.

Each of the segments may have a segment attribute representing the kind(s) of buffer allocation request(s) for which the segment is allocable.

The kind of buffer allocation request may include a write buffer allocation request, a read buffer allocation request, a map cache buffer allocation request, or a garbage collection buffer allocation request. The segments may be allocated in response to the buffer allocation request, and may temporarily store data for performing one among a write operation, a read operation, a map cache operation, and a garbage collection operation.

Although the present invention is not limited the kinds of the buffer allocation requests, as an example, it is described herein that the buffer manager 136 and the buffer 300 may operate in response to three kinds of buffer allocation requests: a read buffer allocation request, a write buffer allocation request, and a map cache buffer allocation.

FIG. 4 illustrates a buffer attribute table, e.g., the buffer attribute table 400 of FIG. 1, in accordance with an embodiment of the present invention.

Referring to FIG. 4, the buffer attribute table 400 may store segment attribute information of each of the segments included in the buffer 300. The buffer attribute table 400 representing the segment attribute of each of the segments by storing, as a bitmap, for each of the segments, the kind(s) of buffer allocation request(s), among a read buffer allocation request, a write buffer allocation request, and a map cache buffer allocation request, for which the corresponding segment may be allocated.

The buffer attribute table 400 may include identifiers for segments (e.g., 12 segments) of the buffer 300 as indices. In the example of FIG. 4, the buffer attribute table 400 may include an identifier of each of the 12 segments as an index. In the entry of each index, bit values having read, write, and map as fields may be set or reset.

The bit values of the read, write and map fields may represent whether an individual segment may be allocated in response to a read buffer allocation request, a write buffer allocation request, and a map cache buffer allocation request, respectively. For example, since the bit values of the read field and the write field of a third segment of the buffer attribute table 400 are '1', the third segment may be allocated in response to a read buffer allocation request and a write buffer allocation request. On the other hand, since the bit value of the map field of the third segment is '0', the third segment may not be allocated in response to the map cache buffer allocation request. In other words, the third segment may be allocated in response to the read buffer request and the write buffer request but not in response to the map cache buffer allocation request.

According to an embodiment of the present invention, the segment attribute may be statically or dynamically set based on the workload of the memory system 110. Below, a segment for which a segment attribute is set dynamically may be defined as a dynamic segment, and a segment for which a segment attribute is set statically may be defined as a static segment.

An example of a method for the buffer manager 136 deciding a segment attribute for each of the segments is described with reference to FIG. 4.

In the example of FIG. 4, the buffer manager 136 may decide, for each of the segments, whether that segment is a dynamic segment or the static segment. For example, the buffer manager 136 may decide that the first to sixth segments are dynamic segments and the seventh to $12^{th}$ segments are static segments.

The host interface 132 may receive a command from the host 102 and queue the command to an internal command queue (not shown). The buffer manager 136 may decide the segment attribute of each of the segments based on the kind and attribute of the queued command and the size of the data to be buffered in response to the command.

The kind of the command received from the host 102 may include a read command and a write command. The attribute of the command may include a sequential command and a random command.

The buffer manager 136 may receive many read buffer allocation requests when many read commands are queued. The buffer manager 136 may receive many write buffer allocation requests when many write commands are queued.

When many random commands of different kinds are received, the buffer manager 136 may receive many map cache buffer allocation requests. This is because the probability that the map data for the address corresponding to each random command are not buffered in the buffer 300 is high.

The buffer manager 136 may calculate the size of the read data, the size of the write data, and the size of the map data to be buffered in the buffer 300 based on the kind and attribute of the commands queued in the command queue and the size of the data to be buffered in response to the commands. The buffer manager 136 may be able to decide the number of the segments that may be allocated for each of the read buffer allocation request, the write buffer allocation request, and the map cache buffer allocation request based on the calculation result.

The buffer manager 136 may decide a set number of consecutive segments from the first segment as the segments that may be allocated in response to the buffer allocation request of the corresponding kinds based on the decided number according to the kind of the buffer allocation request.

For example, the ratio of the size of the read data, the size of the write data, and the size of the map data to be buffered may be decided as approximately 3:2:1. In the example of FIG. 4, the number of the dynamic segments may be six. The buffer manager 136 may set the numbers of the dynamic segments that may be allocated in response to a read buffer allocation request, a write buffer allocation request, and a map cache buffer allocation request in proportion to the size of the read data, the size of the write data, and the size of the map data to be buffered as 6, 4 and 2.

Referring to FIG. 4, the attributes of the dynamic segments may be decided in such a manner that the first to sixth segments are allocated for the read buffer allocation request, the first to fourth segments are allocated for the write buffer allocation request, and the first and second segments are allocated for a map cache buffer allocation request.

In other words, the first segment and the second segment may be set in response to all kinds of buffer allocation requests. The third segment and the fourth segment may be allocated in response to the read buffer allocation request and the write buffer allocation request. The fifth segment and the sixth segment may be dedicated to the read buffer allocation request.

The buffer manager 136 may set each of the seventh to $12^{th}$ segments, which are the static segments, as dedicated segments. Referring to FIG. 4, the seventh and eighth segments may be set as map-dedicated segments, and the ninth and $10^{th}$ segments as write-dedicated segments, and the $11^{th}$ and $12^{th}$ segments as read-dedicated segments. For example, when there is a map buffer allocation request, even if the first and second segments are all allocated for a read operation, the minimum map caching operation may be performed by allocating the seventh and eighth segments for the map buffer allocation request.

The segment attribute of a dynamic segment may be decided periodically based on a change in the workload of the memory system 110.

Figure 5:
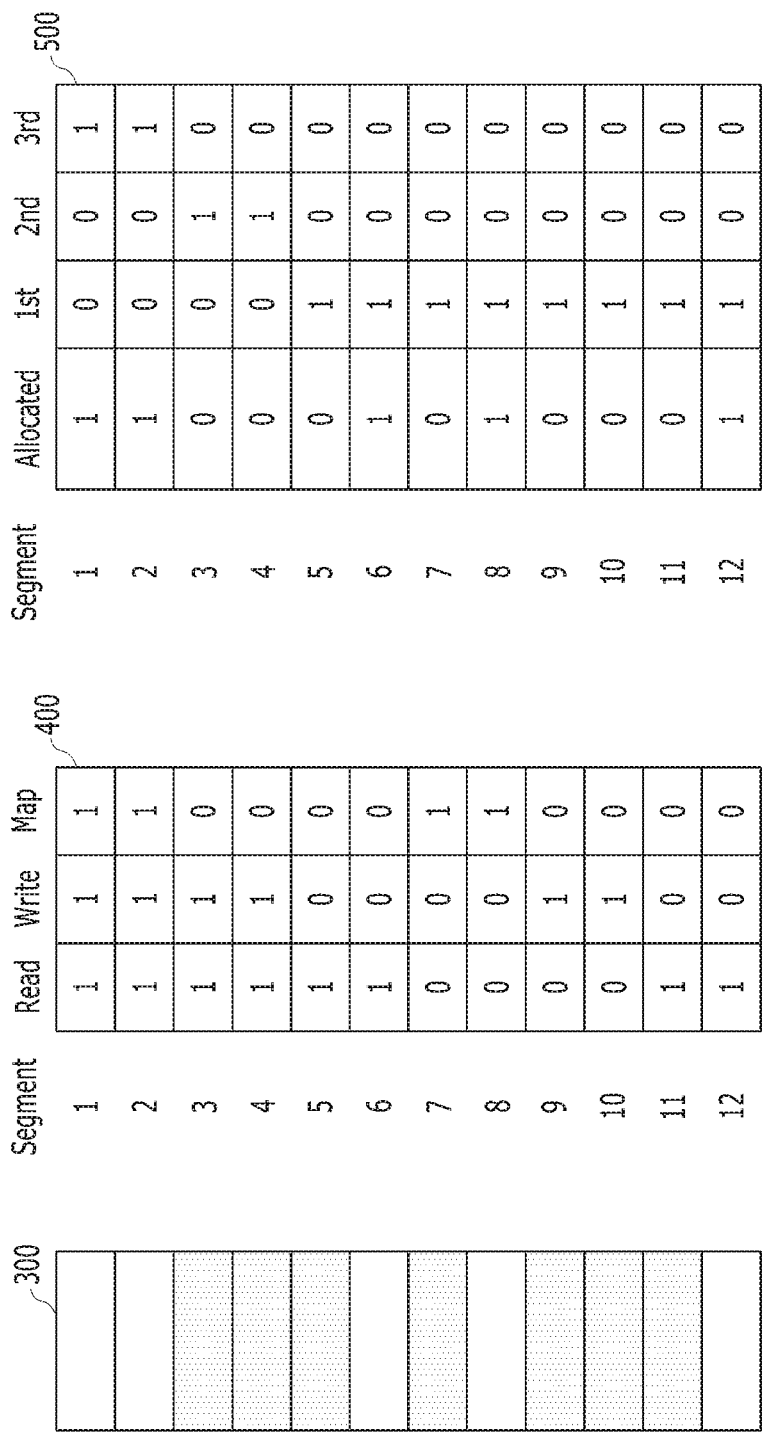
FIG. 5 illustrates a buffer priority table in accordance with an embodiment of the present invention.

FIG. 5 illustrates a buffer priority table, e.g., the buffer priority table 500 of FIG. 1, in accordance with an embodiment of the present invention.

Referring to FIG. 5, the buffer priority table 500 may represent priority information of segment allocation and whether or not a segment is allocated at present. When the buffer manager 136 allocates a segment in response to a buffer allocation request, with reference to the buffer priority table 500, the buffer manager 136 may allocate a segment having the highest priority among the segments that are not allocated at present may be allocated first.

The buffer priority table 500 may include the identifiers of the segments of the buffer 300 as indices. In the entry of each index, there are fields of allocation (allocated), which represents whether the corresponding segment is allocated or not. In the entry of each index, there are fields of 1st, 2nd, 3rd, which represents the priority to which the corresponding segment is allocated. The bit in each field may be set or reset, and thus a priority or order such as a first rank, a second rank, and a third rank may be determined based on the bit values of the fields.

The bit value of the allocation field may be set or reset based on whether each segment is currently allocated or not in response to a buffer allocation request.

In the example of FIG. 5, some segments of the buffer 300 (e.g., segments 3-5, 7 and 9-11) are shaded while the other segments (e.g., segments 1-2, 6, 8 and 12) are not shaded. The shaded segments may represent the segments that are currently allocated, whereas the segments that are not shaded may represent the segments that are not currently allocated. For example, when the bit value of the allocation field in the first entry of the buffer priority table 500 is set to '1', the first segment may be in a state of 'not allocated' at present.

Each of the first to third order fields may have a bit value representing a priority for allocating a segment. Each bit value may be decided based on the bit value of the buffer attribute table 400.

In particular, according to an embodiment of the present invention, when there is a buffer allocation request, the buffer manager 136 may decide the bit value such that a dedicated segment is allocated with priority. When the dedicated segment is already allocated, the bit value may be decided such that a common segment is allocated in the following order. The buffer manager 136 may decide the bit value such that a segment in response to many kinds of buffer allocation requests among the common segments is allocated later.

For example, the bit values of the fifth segment of the buffer attribute table 400 may be set to '1', '0', and '0', respectively. The bit values may represent that the fifth segment is a dedicated segment for a read buffer allocation request. The buffer manager 136 may set the bit values of the first to third rank fields of a fifth entry of the buffer priority table 500 to '1', '0', and '0', respectively, such that the fifth segment is allocated with priority when there is a read buffer allocation request.

As another example, the bit values of the first segment of the buffer attribute table 400 may be set to '1', '1', and '1', respectively. The bit values may represent that the first segment may be allocated for all kinds of buffer allocation requests. The buffer manager 136 may set the bit values of the first to third rank fields of the first entry of the buffer priority table 500 to '0', '0', and '1', respectively, such that the first segment is allocated at last when there is a buffer allocation request.

Figure 6:
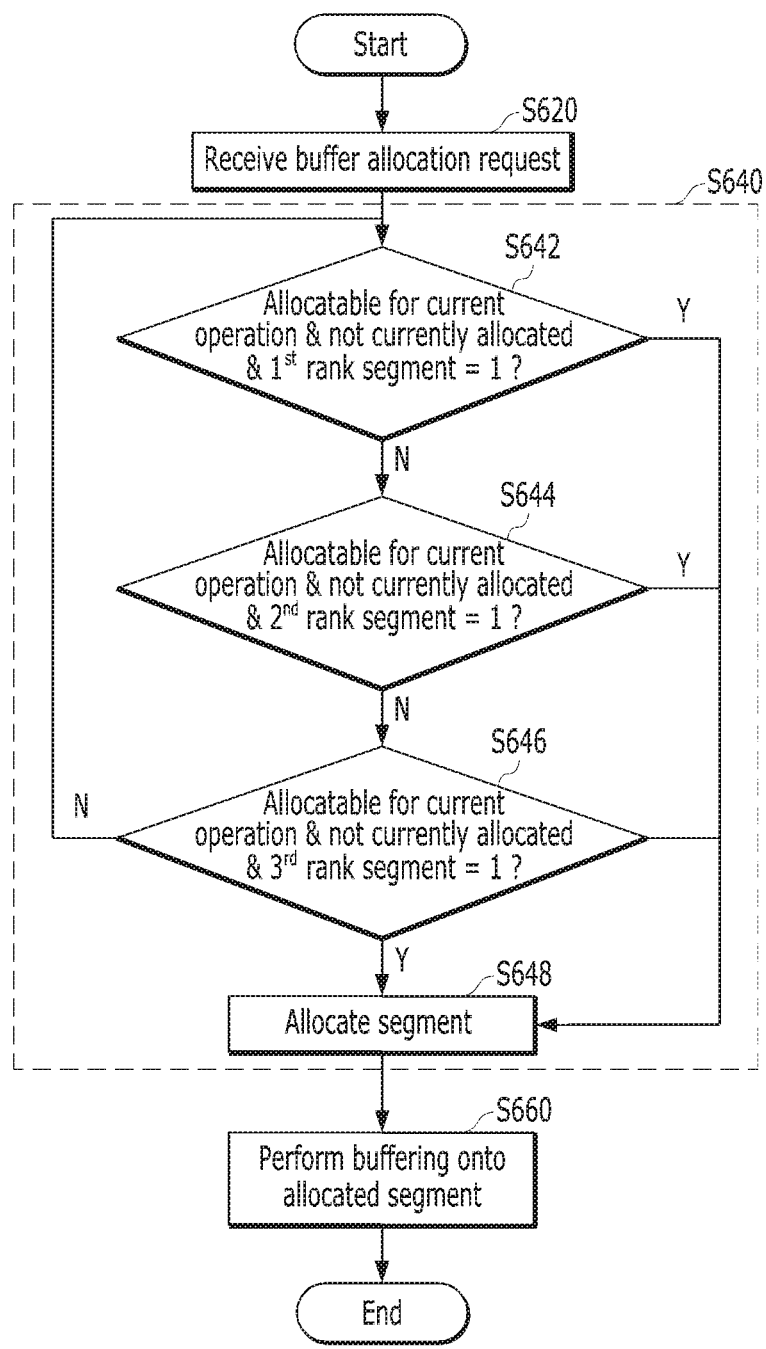
FIG. 6 is a flowchart illustrating an operation of a memory system in accordance with an embodiment of the present invention.

FIG. 6 is a flowchart illustrating an operation of a memory system, e.g., the memory system 110 of FIG. 1, in accordance with an embodiment of the present invention.

Referring to FIG. 6, at step S620, the buffer manager 136 of FIG. 1 may receive a buffer allocation request from the host interface 132 or the memory interface 142.

For example, when a write operation is performed in response to a write command from the host 102, the host interface 132 may request the buffer manager 136 to allocate a write buffer.

When a read operation is performed, the memory interface 142 may request the buffer manager 136 to allocate a read buffer in order to temporarily store the data read from the memory device 150 in the buffer 300.

When a map cache operation is performed, the memory interface 142 may request the buffer manager 136 to allocate a map buffer in order to store the map data read from the memory device 150 in the buffer 300.

At step S640, the buffer manager 136 may allocate a segment in response to the buffer allocation request of step S620. To be specific, the buffer manager 136 may refer to the buffer attribute table 400 and the buffer priority table 500. Then, the buffer manager 136 may allocate the segments that are not allocated at present among the allocable segments according to the kind of the buffer allocation request. That is, the buffer manager 136 may allocate the segments that may be allocated at present, in the order of a first rank segment, a second rank segment, and a third rank segment.

According to an embodiment of the present invention, the operation of step S640 may be performed according to the detailed steps S642 to S648, which are described below.

At step S642, the buffer manager 136 may decide whether there is a segment whose value of an AND operation is '1' by performing an AND operation on one bit value among the read, write, and map fields of the corresponding segment, the bit value of the allocation field, and the bit value of the first rank field based on the buffer allocation request. A segment whose value of the AND operation is '1' is the first rank segment that may be allocated at present.

When there is the first rank segment that may be allocated at present ("Y" at step S642), the buffer manager 136 may allocate the first rank segment that may be allocated at present in response to the buffer allocation request at step S648. There may be a plurality of the first rank segments that may be allocated at present, and the buffer manager 136 may allocate at least one among the first rank segments according to the size of a buffer required by the buffer allocation request.

In the example of FIG. 5, when the buffer manager 136 receives the write buffer allocation request at the step S620, there is no segment whose bit value of the write field, bit value of the allocation field, and bit value of the first rank field among the 12 segments are all '1'. Therefore, since there is no segment whose value of the AND operation is '1', there is no first rank segment that may be allocated at present in response to the read buffer allocation request.

If there is no first rank segment that may be allocated at present ("N" at the step S642), the buffer manager 136 may decide at step S644 whether there is a segment whose value of an AND operation is '1' or not by performing the AND operation on the bit value of one field among a read field, a write field, and a map field of each segment, the bit value of an avocation field, and the bit value of a second rank field according to the kind of the buffer allocation request. A segment whose value of the AND operation is '1' may be the second rank segment that may be allocated in response to the current buffer allocation request.

When there is the second rank segment that may be allocated at present ("Y" at the step S644), the buffer manager 136 may allocate at least one among the second rank segments that may be allocated at present in response to the buffer allocation request at step S648 based on the size of a buffer required by the buffer allocation request.

In the example of FIG. 5, there is no segment in which the bit value of the write field, the bit value of the allocation field, and the bit value of the second rank field are all '1' among eight segments.

Therefore, since there is no segment whose value of the AND operation is '1', there is no second rank segment that may be allocated in response to the current read buffer allocation request.

When there is no second rank segment that may be allocated at present ("N" at the step S644), the buffer manager 136 may decide at step S646 whether there is a segment whose value of an AND operation is '1' by performing the AND operation onto the bit value of one field among a read field, a write field, and a map field of each segment, the bit value of the allocation field which represents whether it is allocated or not, and the bit value of a third rank field according to the kind of the buffer allocation request. A segment whose value of the AND operation is '1' may be the third rank segment that may be allocated in response to the current buffer allocation request.

When there is a third rank segment that may be allocated at present ("Y" at the step S646), at step S648, the buffer manager 136 may allocate at least one among the third rank segments that may be allocated at present in response to a buffer allocation request according to the size of a buffer required by the buffer allocation request.

In the example shown in FIG. 5, the segment in which the bit value of the write field, the bit value of the allocation field, and the bit value of the third rank field are all '1' among the eight segments are the first segment and the second segment. Accordingly, the buffer manager 136 may allocate at least one between the first segment and the second segment in response to a read buffer allocation request at step S648.

If there is no third rank segment that may be allocated at present ("N" at the step S646), the buffer manager 136 may repeatedly perform the operations of the steps S642 to S646 until there is a segment that may be allocated, because there is no segment that may be allocated to perform the corresponding operation at present.

When the buffer allocation at step S640 is completed, the host interface 132 or the memory interface 142 may buffer data in the allocated segment at step S660.

According to embodiments of the present invention, when the workload of the memory system 110 is concentrated on certain operation, for example, on performing a write operation, the performance of the write operation may be maintained by additionally allocating a common segment for the write operation. Further, for other kinds of operations, e.g., a read operation, a minimum read operation may be performed by allocating a dedicated segment to a read buffer allocation request.

Referring to FIGS. 7 to 15, a data processing system and electronic devices to which the memory system 110 including the memory device 150 and the controller 130, described with reference to FIGS. 1 to 6, is applied is described in more detail below.

Figure 7:
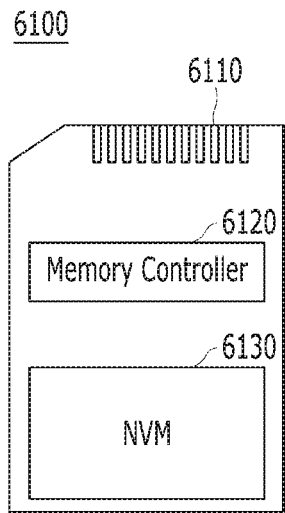
FIGS. 7 to 15 illustrate examples of a data processing system including a memory system in accordance with embodiments of the present invention.

FIG. 7 is a diagram schematically illustrating the data processing system including the memory system in accordance with an embodiment. FIG. 7 schematically illustrates a memory card system 6100 to which the memory system in accordance with an embodiment is applied.

Referring to FIG. 7, the memory card system 6100 may include a memory controller 6120, a memory device 6130 and a connector 6110.

More specifically, the memory controller 6120 may be connected to the memory device 6130 embodied by a nonvolatile memory (NVM), and configured to access the memory device 6130. For example, the memory controller 6120 may be configured to control read, write, erase and background operations of the memory device 6130. The memory controller 6120 may be configured to provide an interface between the memory device 6130 and a host (not shown), and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, as shown in FIG. 1, the memory controller 6120 may include a random access memory (RAM), a processor, a host interface, a memory interface and an error correction component.

The memory controller 6120 may communicate with an external device, for example the host 102 of FIG. 1, through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), wireless fidelity (Wi-Fi or WiFi) and Bluetooth. Thus, the memory system and the data processing system may be applied to wired and/or wireless electronic devices, particularly mobile electronic devices.

The memory device 6130 may be implemented by a nonvolatile memory. For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may be integrated to form a solid-state driver (SSD). Also, the memory controller 6120 and the memory device 6130 may form a memory card such as a PC card (e.g., Personal Computer Memory Card International Association (PCMCIA)), a compact flash (CF) card, a smart media card (e.g., SM and SMC), a memory stick, a multimedia card (e.g., MMC, RS-MMC, MMCmicro and eMMC), an secured digital (SD) card (e.g., SD, miniSD, microSD and SDHC) and/or a universal flash storage (UFS).

Figure 8:
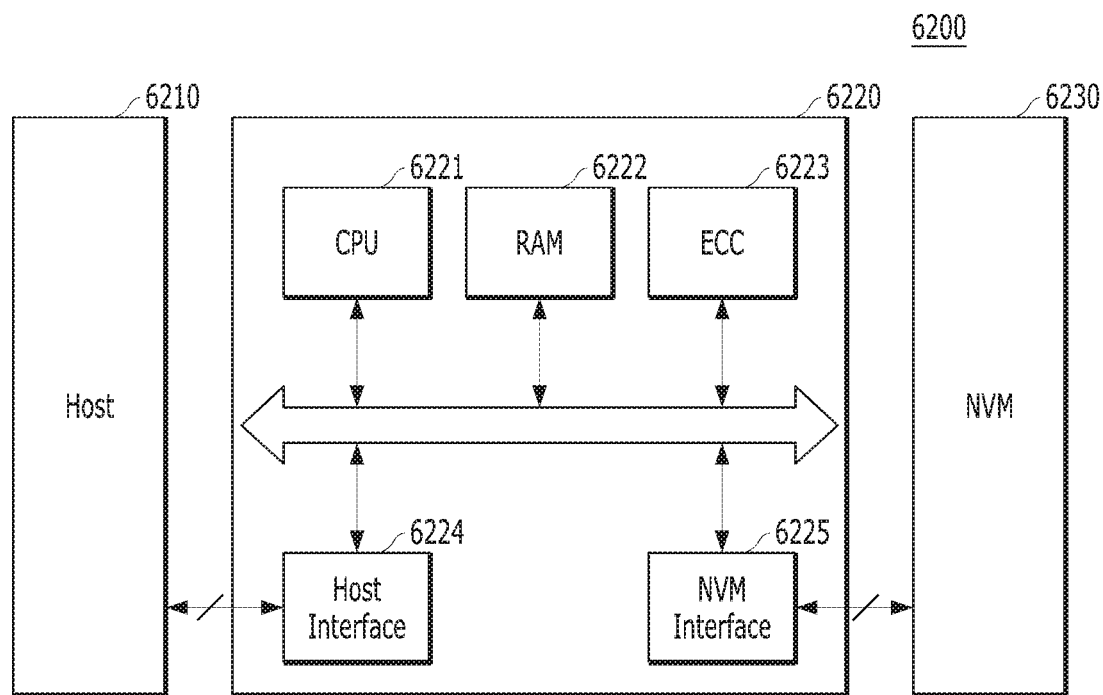

FIG. 8 is a diagram schematically illustrating another example of a data processing system 6200 including the memory system in accordance with an embodiment.

Referring to FIG. 8, the data processing system 6200 may include a memory device 6230 having one or more nonvolatile memories (NVMs) and a memory controller 6220 for controlling the memory device 6230. The data processing system 6200 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more central processing units (CPUs) 6221, a buffer memory such as a random access memory (RAM) 6222, an error correction code (ECC) circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the memory device 6230 to operate at high speed.

The ECC circuit 6223 may correspond to the ECC component of the controller 130 illustrated in FIG. 1. As described with reference to FIG. 1, the ECC circuit 6223 may generate an error correction code (ECC) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The CC circuit 6223 may perform error correction decoding on data outputted from the memory device 6230. The CC circuit 6223 may correct an error using the parity bit. For example, as described with reference to FIG. 1, the ECC circuit 6223 may correct an error using Low Density Parity Check (LDPC) code, Bose-Chaudhri-Hocquenghem (BCH) code, turbo code, Reed-Solomon code, convolution code, Recursive Systematic Code (RSC) or coded modulation such as Trellis-Coded Modulation (TCM) or Block coded modulation (BCM).

The memory controller 6220 may exchange data with the host 6210 through the host interface 6224, and exchange data with the memory device 6230 through the NVM interface 6225. The host interface 6224 may be connected to the host 6210 through a parallel advanced technology attachment (DATA) bus, serial advanced technology attachment (SATA) bus, small computer system interface (SCSI), universal serial bus (USB), peripheral component interconnect-express (PCIe) or NAND interface. The memory controller 6220 may have a wireless communication function with a mobile communication protocol such as wireless fidelity (WiFi) or Long Term Evolution (LTE). The memory controller 6220 may be connected to an external device, for example, the host 6210 or another external device, and then exchange data with the external device. In particular, as the memory controller 6220 is configured to communicate with the external device through one or more of various communication protocols, the memory system and the data processing system may be applied to wired and/or wireless electronic devices, particularly a mobile electronic device.

Figure 9:
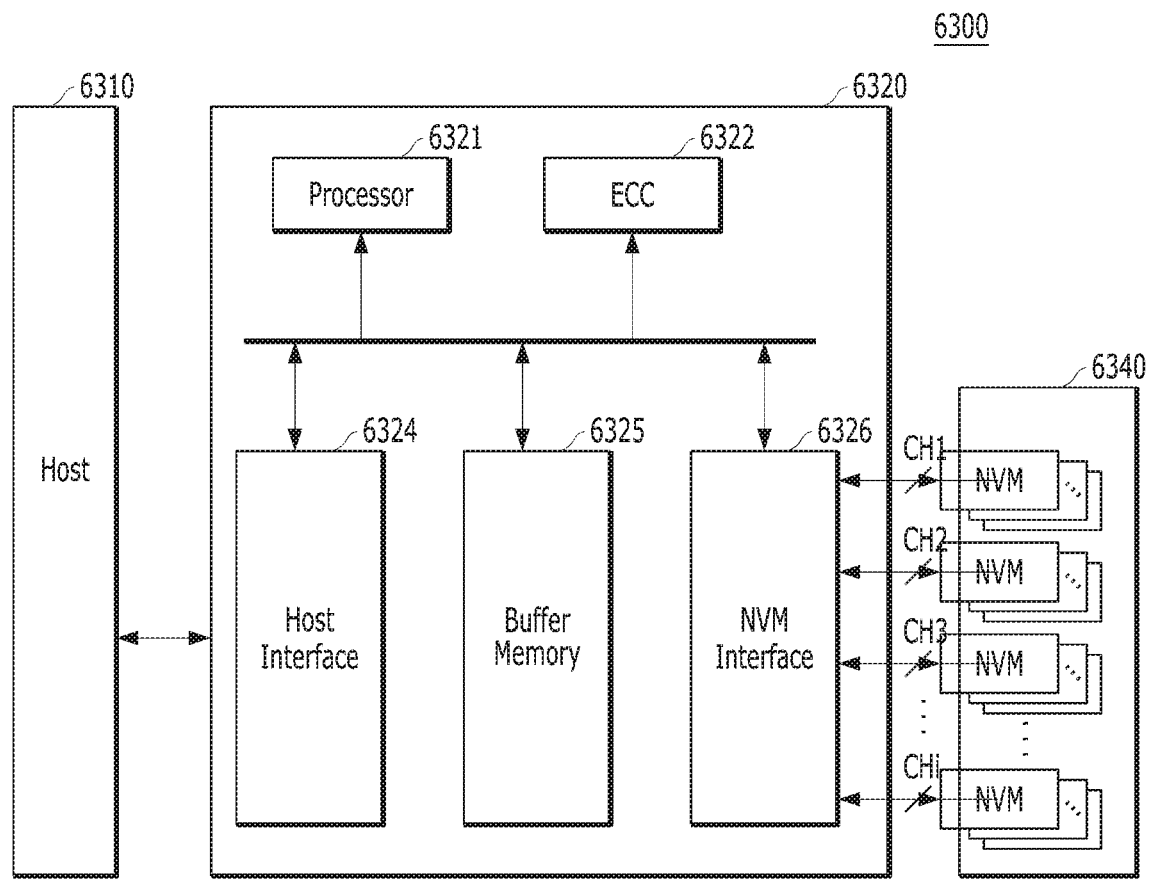

FIG. 9 is a diagram schematically illustrating another example of the data processing system including the memory system in accordance with an embodiment. FIG. 9 schematically illustrates a solid state drive (SSD) 6300 to which the memory system may be applied.

Referring to FIG. 9, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

Figure 10:
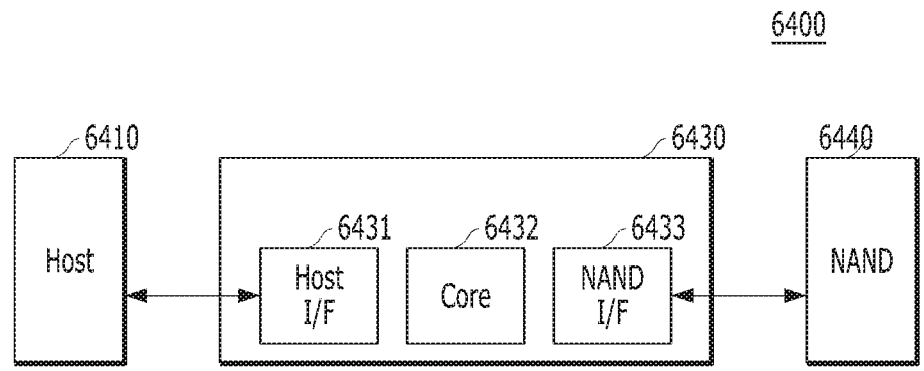

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by any of a variety of volatile memories such as dynamic random access memory (DRAM), synchronous DRAM (SDRAM), double data rate (DDR) SDRAM, low power DDR (LPDDR) SDRAM and graphics RAM (GRAM) or nonvolatile memories such as ferroelectric RAM (FRAM), resistive RAM (RRAM or ReRAM), spin-transfer torque magnetic RAM (STT-MRAM) and phase-change RAM (PRAM). By way of example, FIG. 10 illustrates that the buffer memory 6325 is disposed in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

FIG. 10 is a diagram schematically illustrating another example of the data processing system including the memory system in accordance with an embodiment. FIG. 10 schematically illustrates an embedded Multi-Media Card (eMMC) 6400 to which the memory system may be applied.

Referring to FIG. 10, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface (I/F) 6431 and a memory interface, for example, a NAND interface (I/F) 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, Ultra High Speed (UHS)-I and UHS-II interface.

Each of the memory controller 6120, the memory controller 6220, the controller 6320, and the controller 6430 described with reference to FIGS. 7 to 10 may include a buffer including a plurality of segments, and a buffer manager which decides a segment attribute for each of the segments, decides a priority for segment allocation for each of the segments based on the segment attribute, and when a buffer allocation request is received, allocates one or more segments among the segments based on the segment attribute and the priority of the segment allocation.

FIGS. 11 to 14 are diagrams schematically illustrating other examples of the data processing system including the memory system in accordance with one or more embodiments. FIGS. 11 to 14 schematically illustrate universal flash storage (UFS) systems to which the memory system may be applied.

Referring to FIGS. 11 to 14, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired and/or wireless electronic devices or particularly mobile electronic devices, the UFS devices 6520, 6620, 6720 and 6820 may serve as embedded UFS devices. The UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired and/or wireless electronic devices or particularly mobile electronic devices through UFS protocols. The UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 8 to 10, and the UFS cards 6530, 6630, 6730 and 6830 may be embodied in the form of the memory card system 6100 described with reference to FIG. 9.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, universal storage bus (USB) Flash Drives (UFDs), multi-media card (MMC), secure digital (SD), mini-SD, and micro-SD.

Figure 11:
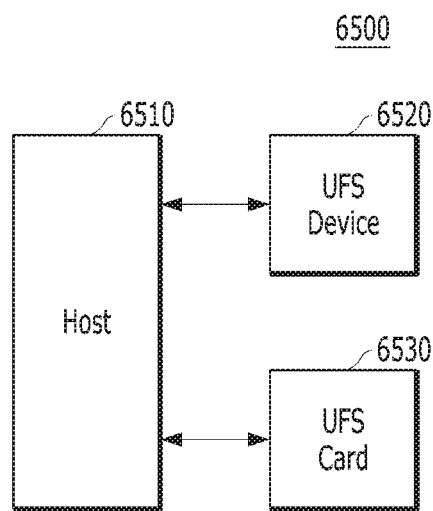

In the UFS system 6500 illustrated in FIG. 11, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. UFS device 6520 and the UFS card 6530 may communicate with each other through link layer switching at the UniPro of the host 6510. In the embodiment of FIG. 11, the configuration in which one UFS device 6520 and one UFS card 6530 are connected to the host 6510 is illustrated by way of example. However, in another embodiment, a plurality of UFS devices and UFS cards may be connected in parallel or in the form of a star to the host 6510, and a plurality of UFS cards may be connected in parallel or in the form of a star to the UFS device 6520 or connected in series or in the form of a chain to the UFS device 6520.

Figure 12:
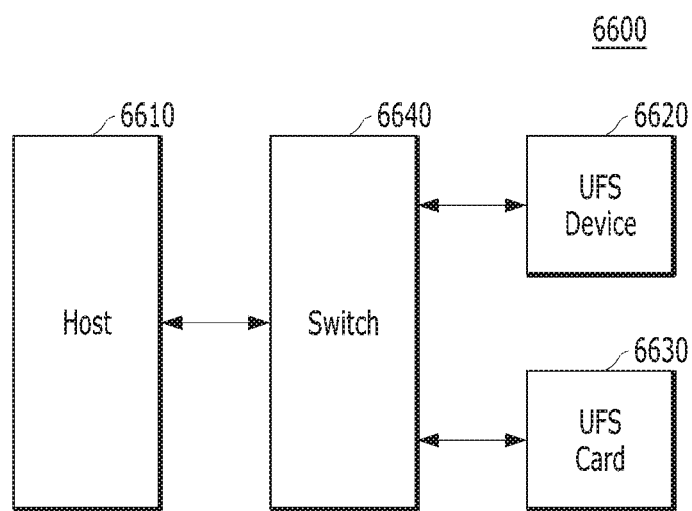

In the UFS system 6600 illustrated in FIG. 12, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the embodiment of FIG. 12, the configuration in which one UFS device 6620 and one UFS card 6630 are connected to the switching module 6640 is illustrated by way of example. However, in another embodiment, a plurality of UFS devices and UFS cards may be connected in parallel or in the form of a star to the switching module 6640, and a plurality of UFS cards may be connected in series or in the form of a chain to the UFS device 6620.

Figure 13:
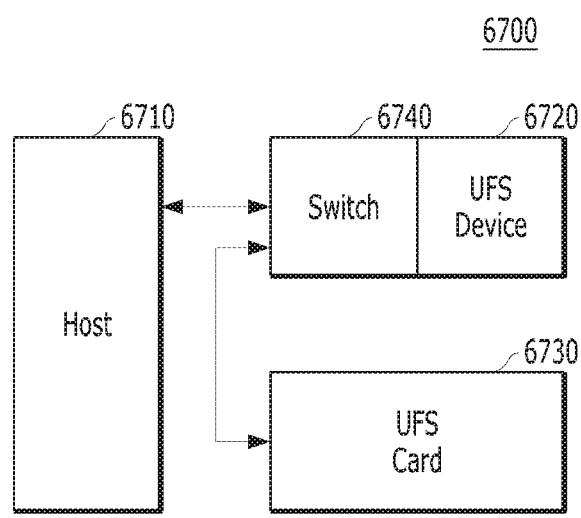

In the UFS system 6700 illustrated in FIG. 13, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the embodiment of FIG. 13, the configuration in which one UFS device 6720 and one UFS card 6730 are connected to the switching module 6740 is illustrated by way of example. However, in another embodiment, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 14:
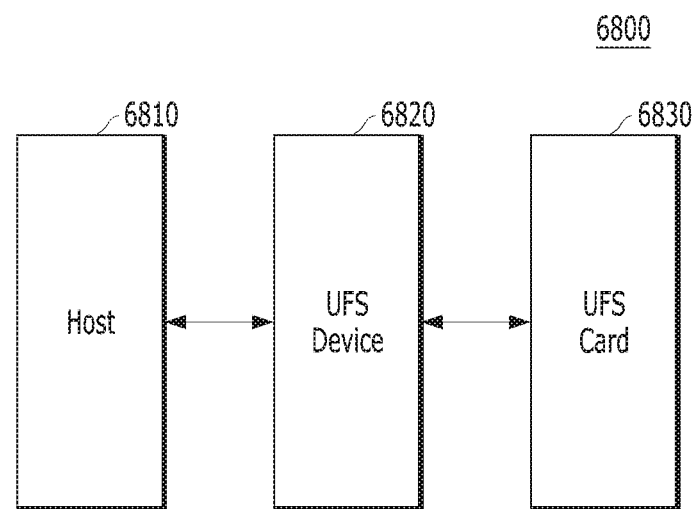

In the UFS system 6800 illustrated in FIG. 14, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target Identifier (ID) switching operation. The host 6810 and the UFS card 6830 may communicate with each other through target ID switching between the M-PHY and UniPro modules of the UFS device 6820. In the embodiment of FIG. 14, the configuration in which one UFS device 6820 is connected to the host 6810 and one UFS card 6830 is connected to the UFS device 6820 is illustrated by way of example. However, in another embodiment, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 15:
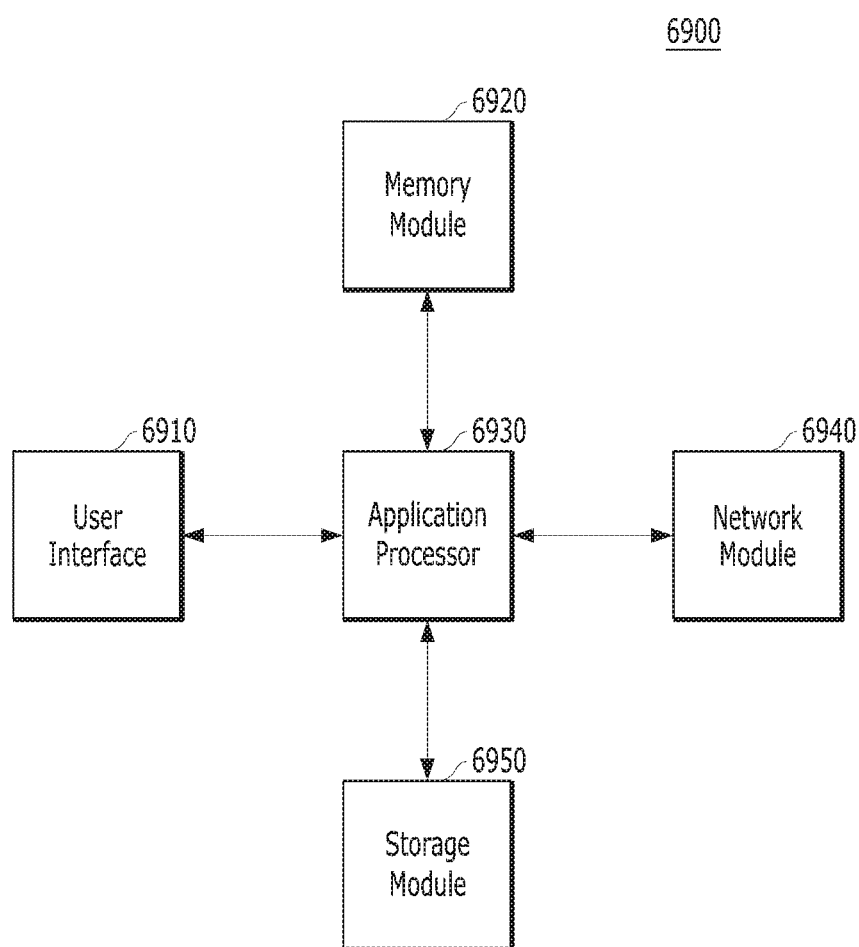

FIG. 15 is a diagram schematically illustrating another example of the data processing system including the memory system in accordance with an embodiment. FIG. 15 is a diagram schematically illustrating a user system 6900 to which the memory system may be applied.

Referring to FIG. 15, the user system 6900 may include a user interface 6910, a memory module 6920, an application processor 6930, a network module 6940, and a storage module 6950.

More specifically, the application processor 6930 may drive components included in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, DDR2 SDRAM, DDR3 SDRAM, LPDDR SDARM, LPDDR3 SDRAM or LPDDR3 SDRAM or a nonvolatile RAM such as a phase-change RAM (PRAM), a resistive RAM (ReRAM), a magneto-resistive RAM (MRAM) or a ferroelectric RAM (FRAM). For example, the application processor 6930 and the memory module 6920 may be packaged and mounted, based on Package on Package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 9 to 14.

According to embodiments, the storage module 6950 may include a buffer including a plurality of segments, and a buffer manager which decides a segment attribute for each of the segments, decides a priority for segment allocation for each of the segments based on the segment attribute, and when a buffer allocation request is received, allocates one or more segments among the segments based on the segment attribute and the priority of the segment allocation.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired and/or wireless communication with an external device. The user interface 6910 may display data processed by the processor 6930 on a display/touch module of the mobile electronic device, or support a function of receiving data from the touch panel.

According to embodiments of the present invention, a controller has a data buffer that may improve the performance of a memory system, and a method for operating the controller.

While the present invention has been illustrated and described with respect to the specific embodiments, it will be apparent to those skilled in the art in light of the present disclosure that various changes and modifications may be made without departing from the spirit and scope of the invention as defined in the following claims.

What is claimed is:

1. A controller for controlling a memory device, comprising:
a buffer including a plurality of segments; and
a buffer manager suitable for deciding a segment attribute for each segment as a dedicated segment which is for one kind of a buffer allocation request or a common segment which is for two or more kinds of buffer allocation requests among a plurality of kinds of buffer allocation requests, deciding a priority which indicates an allocation order of a corresponding segment among the plurality of segments, for each segment by assigning a higher priority to the dedicated segment than the common segment, and when a buffer allocation request is received, allocating one or more segments among the plurality of segments based on a kind of the received buffer allocation request by performing a logic operation on bits representing the segment attribute, the priority and information whether or not the corresponding segment is allocated.

2. The controller of claim 1, wherein the buffer manager decides a size of data to be buffered by each kind of buffer allocation request according to a kind and attribute of a command received from a host, decides the number of segments that are allocable according to the kind of each buffer allocation request based on the size of the data to be buffered, and decides the segment attribute based on the decided number of segments.

3. The controller of claim 1, further comprising:
a memory,
wherein the memory includes:
a buffer attribute table for storing segment attributes for the plurality of segments; and
a buffer priority table for storing the priority and the information on whether or not the corresponding segment is allocated at present.

4. The controller of claim 3, wherein the buffer priority table stores the priority of each of the segments and the information on whether or not the corresponding segment is allocated at present in a bit map.

5. The controller of claim 1, wherein the kind of the buffer allocation request is one among a read buffer allocation request, a write buffer allocation request, and a map buffer allocation request.

6. The controller of claim 1, further comprising:
a host interface; and
a memory interface,
wherein at least one of the host interface and the memory interface requests the buffer manager for a buffer allocation.

7. The controller of claim 6, wherein the at least one of the host interface and the memory interface performs a buffering operation on each allocated segment.

8. A method for operating a controller that controls a memory device, comprising:
deciding a segment attribute for each of a plurality of segments in a buffer of the controller, as a dedicate segment which is for one kind of a buffer allocation request or a common segment which is for two or more kinds of buffer allocation requests among a plurality of kinds of buffer allocation requests;
deciding a priority which indicates an allocation order of a corresponding segment among the plurality of segments, for each of the segments based on the segment by assigning a higher priority to the dedicated segment than the common segment; and
allocating, when a buffer allocation request is received, one or more segments among the plurality of segments based on the kind of the received buffer allocation request by performing a logic operation on bits representing the segment attribute, the priority, and information on whether or not the corresponding segment is allocated.

9. The method of claim 8, wherein the deciding of the segment attribute includes:
deciding a size of data to be buffered by each kind of buffer allocation request according to a kind and attribute of a command received from a host;
deciding the number of segments that are allocable according to the kind of each buffer allocation request based on the size of the data to be buffered; and
deciding a segment attribute of each of the segments based on the decided number of segments.

10. The method of claim 9, further comprising:
storing a priority of each of the segments and the information on whether or not the corresponding segment is allocated at present in a bit map.

11. The method of claim 8, wherein the kind of buffer allocation request is one among a read buffer allocation request, a write buffer allocation request, and a map buffer allocation request.

12. The method of claim 8, further comprising:
performing a buffering operation on the one or more allocated segments.

13. A memory system comprising:
a memory device;
a controller suitable for controlling the memory device to perform a plurality of operations,
wherein the controller includes:

a buffer including a plurality of segments including dedicated segments suitable for buffering data corresponding to one kind of operation among the plurality of operations and common segments suitable for buffering data corresponding to two or more kinds of operations among the plurality of operations; and a buffer manager suitable for:

determining one or more allocable segments, among the plurality of segments, for each of the plurality of operations;

determining a priority which indicates an allocation order of a corresponding segment among the plurality of segments, for each of the plurality of segments based on each of the determined allocable segments is the dedicated segment or the common segment; and allocating at least one segment based on the kind of the received buffer allocation request by performing a logic operation on bits representing the segment attribute, the priority, and information on whether or not the corresponding segment is allocated.

14. The memory system of claim 13, wherein each of the plurality of segments is allocable for at least one among a read operation, a write operation and a map cache operation depending, by the buffer manager, on the determining one or more allocable segments.

* * * * *